Aug. 2, 1932.   A. STRAND ET AL   1,869,720
BEVERAGE MAKING MACHINE
Filed Feb. 26, 1930   7 Sheets-Sheet 1

FIG.1

INVENTORS
ANDREW STRAND
JOHN B. HAWLEY, JR
BY
ATTORNEYS

Aug. 2, 1932.  A. STRAND ET AL  1,869,720
BEVERAGE MAKING MACHINE
Filed Feb. 26, 1930   7 Sheets-Sheet 4

INVENTORS
ANDREW STRAND
JOHN B. HAWLEY, JR.
BY
ATTORNEYS

Aug. 2, 1932. A. STRAND ET AL 1,869,720
BEVERAGE MAKING MACHINE
Filed Feb. 26, 1930 7 Sheets-Sheet 5

INVENTORS
ANDREW STRAND
JOHN B. HAWLEY, JR.
BY
ATTORNEYS

INVENTORS
ANDREW STRAND
JOHN B. HAWLEY, JR.
BY
ATTORNEYS

Fig.14

Patented Aug. 2, 1932

1,869,720

UNITED STATES PATENT OFFICE

ANDREW STRAND AND JOHN B. HAWLEY, JR., OF MINNEAPOLIS, MINNESOTA, ASSIGNORS, BY DIRECT AND MESNE ASSIGNMENTS, TO ANNE FOLEY PHELPS, OF MINNEAPOLIS, MINNESOTA

BEVERAGE MAKING MACHINE

Application filed February 26, 1930. Serial No. 431,452.

This invention relates to a machine for preparing beverages, and has more particular reference to a coffee making machine.

An object of the invention is to provide a beverage making machine in which the beverage making material, such as ground coffee, is automatically supplied to a container in the machine in quantity having definite relation to the amount of liquid, such as hot water, also automatically supplied to said container and caused to percolate through said material; in which the total supply of said material and liquid to said container is in proportion to the supply of made beverage withdrawn from the machine; and in which means is provided for automatically removing the spent beverage making material from said container.

A further object is to provide a beverage making machine in which liquid, such as hot water, is fed through a continuously moving mass of beverage making material, such as ground coffee, to produce a liquid beverage, which beverage is preferably then strained to eliminate objectionable particles, such as coffee grounds, and passed to a receptacle from which the beverage is to be directly drawn and served.

A still further object is to provide means in the machine for automatically starting the beverage making operation as soon as the supply of liquid in the service receptacle becomes low, and to automatically stop the beverage making operation as soon as said receptacle becomes replenished with beverage to a desired extent.

A still further object is to provide thermally controlled means in the machine for maintaining both the beverage making liquid and the made beverage at predetermined uniform temperatures, respectively.

A still further object is to provide a beverage making machine in which the various elements of the machine requiring frequent cleaning and washing may be easily and quickly removed for that purpose.

And a still further object is to provide in the machine various novel and specific features and characteristics of construction which will constitute improvements generally over the features and characteristic of beverage making machines heretofore known.

With the above objects in view, as well as others which will appear as the specification proceeds, the invention comprises the construction, arrangement and combination of parts as now to be fully described, it being understood that the disclosure herein is merely illustrative and meant in no way in a limiting sense, changes in details of construction and arrangement of parts being permissible so long as within the scope of the claims which follow.

The machine of the present invention is more particularly adapted for use in instances where a beverage, such as coffee, is required in large quantity and is served in small parcels, as, for example, in hotels and restaurants; is adapted to make the beverage, such as coffee, of uniform taste and of predetermined strength; is adapted to utilize the entire strength of the material, such as ground coffee beans, from which the beverage is made; and is adapted to make the beverage in volume depending upon the amount required as predetermined by the quantity of beverage taken from the machine, as, for example, by the number of cupfuls of coffee drawn from a receptacle.

Briefly, the purpose of the invention is to provide a machine for automatically making a beverage, such as coffee, and for automatically removing the spent material, as, for example, spent ground coffee beans, from the beverage making location of the machine, in such manner that automatic production of the beverage can be continuous over long periods of time merely by supplying the machine with sufficient quantities of the beverage making material.

The particular machine disclosed has been designed to make coffee. It includes a container adapted to receive ground coffee beans from a hopper above the container, means whereby hot water can be fed to the container and caused to percolate through the ground coffee beans, a receptacle for the made coffee which desirably flows through a strainer or filter on its way from the container to the receptacle, means for feeding ground coffee to the container in definite predetermined amount relative to the amount of hot water fed to said container, whereby to make coffee of uniform and predetermined strength, means for controlling the supply of ground coffee and hot water to the container in accordance with the supply of made coffee in said receptacle, and means for removing the ground coffee from the container when it becomes spent.

In the accompanying drawings forming a part of this specification.

With respect to the drawings and the numerals of reference thereon, 15 designates a desirably circular base upon which the housing of the machine is seated. Numerals 16 and 17 designate upper and lower sections, respectively, of the machine housing, and 18 denotes a horizontal partition or floor secured between said sections, the partition or floor 18 have a depending flange 19 provided with inwardly projecting lugs or bolts 20. The lower section 17 of the machine housing consists of semi-cylindrical sections 21 one of which is hingedly secured upon the base, as at 22, in a manner which will hereinafter more fully appear, and adapted to close against each other and to be fastened together as by a latch 23.

A hot water tank 24, mounted upon the forward portion of the partition or floor 18, has an intake of cold water supply pipe 25 and a convenient drain cock 26. The water supply in its tank is automatically contained at a predetermined level by a valve control float, designated generally by numeral 27. The water in the tank 24 is heated by an electric heating element 28, the current to which is controlled by a thermostatically operated switch designated 29, to maintain a uniform temperature of the water, as will be hereinafter more fully set forth. The hot water in the tank 24 is conducted to the point where it is to be discharged into the ground coffee by a pipe 30 having an electrically controlled solenoid valve 31 the control circuit for which will be later described.

Secured over a central aperture in the partition or floor 18 is a hollow post or standard 32 having a peripheral chamber 33 at its upper end to accommodate a worm gear 34 and a driving worm 35 therefor. The chamber 33 is closed by a cupping flange 36 of a hopper 37 which is of conical shape as disclosed. The upper edge of the hopper 37 has a vertical flange 38 to receive a cover 39, and has a horizontal flange 40 to receive the inturned upper end flange of the housing section 16, the lower portion of which section fits over a vertical flange 41 upon the partition or floor 18 serving as a support for said upper section 16. Ground coffee placed into the hopper 37 will, evidently, flow through the gear 34 and down through the hollow post or standard 32.

Figure 8:
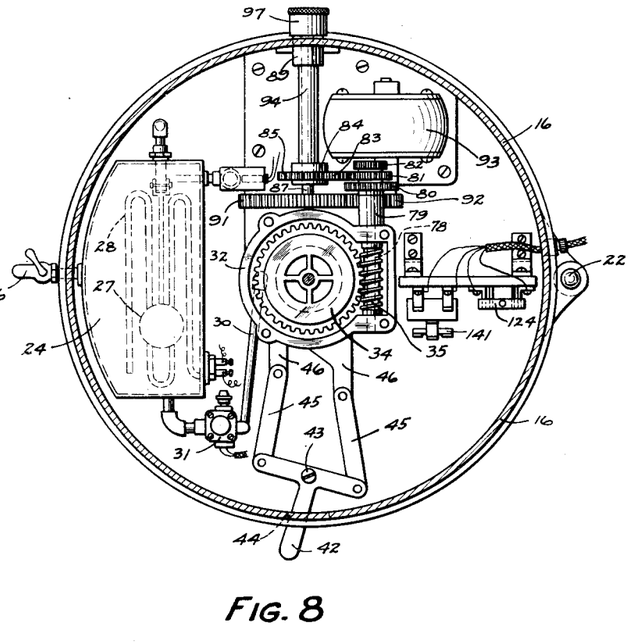
Fig. 8 is a sectional view as seen substantially on irregular line 8—8 in Fig. 1.
Figure 9:
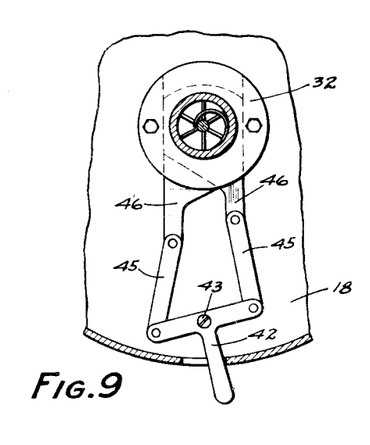
Figs. 9 and 10 are detail sectional views showing the ground coffee control gates or valves, the coffee port being shown as open in Fig. 9 and closed in Fig. 10, both of these views appearing as being taken on line 9—9 in Fig. 1.
Figure 10:
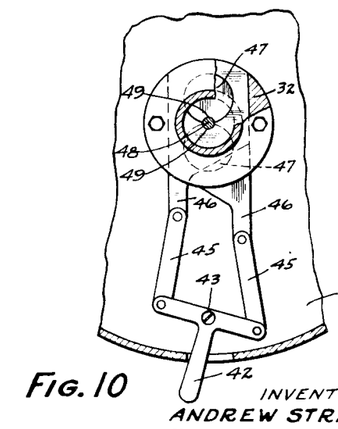

The lower or discharge end of the hollow post or standard 32 is provided with a manually controlled valve for shutting-off the supply of ground coffee at will. This valve and its operating mechanism is more clearly illustrated in Figs. 9 and 10. A T-shaped hand lever 42 is pivotally secured to the partition or floor 18, as at 43, with the handle end of said hand lever projecting out through a slot 44 in the machine housing. See Fig. 8. Opposite ends of the lever 42 are connected by links 45 to a pair of gates 46 that operate in a horizontal channel or slot at the lower end of the hollow post or standard 32. The gates 46 are provided with openings 47 which register with the passage through the hollow post or standard 32 when the lever 42 is in right hand position as shown in Fig. 9. When the lever is shifted to left hand position, the gates 46 move in opposite directions to close the passage through the hollow post or standard 32, as shown in Fig. 10.

An axially disposed shaft 48 is slidably keyed in the hub of the worm gear 34 so as to be rotatable thereby but removable therefrom. The shaft 48 extends down through the hollow post or standard 32, and the openings 47 are provided with notches 49 so that there will be no interference from the shaft 48 to the closing of the gates 46.

The shaft 48 extends down into a centrally depending integral flange or sleeve 50 of the partition or floor 18. The lower end of the shaft 48 is provided with a small bar or projecting pin 51, which pin is non-rotatably secured, as by a set screw 52, but which set screw, by operating in a slot in the bar or pin, permits the latter to have a limited sliding movement in the shaft 48. A confined spring 53 in the shaft tends to continuously project the bar within the limits permitted by the set screw. The lower end of the bar or pin 51 extends down into the upper end 54 of a hollow spindle 55, and a key 56, extending through the bar or pin 51, is arranged to fit into notches in adjoining ends of the shaft 48 and the spindle 55, the spindle thus being held in alinement with the shaft to be driven thereby. Evidently, the spindle can be removed from the shaft by downward movement of the spindle, which movement can be effected without unscrewing or first releasing any of the parts of the machine. The object of rendering the bar or pin 51 and the key 56 yieldingly projectable is to permit the spindle 55 and its attached parts to be set into place without necessarily effecting registration with the key 56, which would be pushed up into the notches in the shaft 48 in case of non-registry. As soon, however, as the shaft 48 is rotated, the key 56 will drop into driving contact with the spindle.

The spindle 55 is formed integral with, or at least rigid with, a sleeve 57, a transversely extending pipe or tube 58 connecting said spindle and sleeve with each other, and a pair of feed propeller blades 59 are also formed integral with the spindle 55, said propeller blades desirably being disposed at right angles to and above the pipe 58. The spindle 55 includes a hollow projecting portion 60 beneath said pipe 58.

Figure 1:
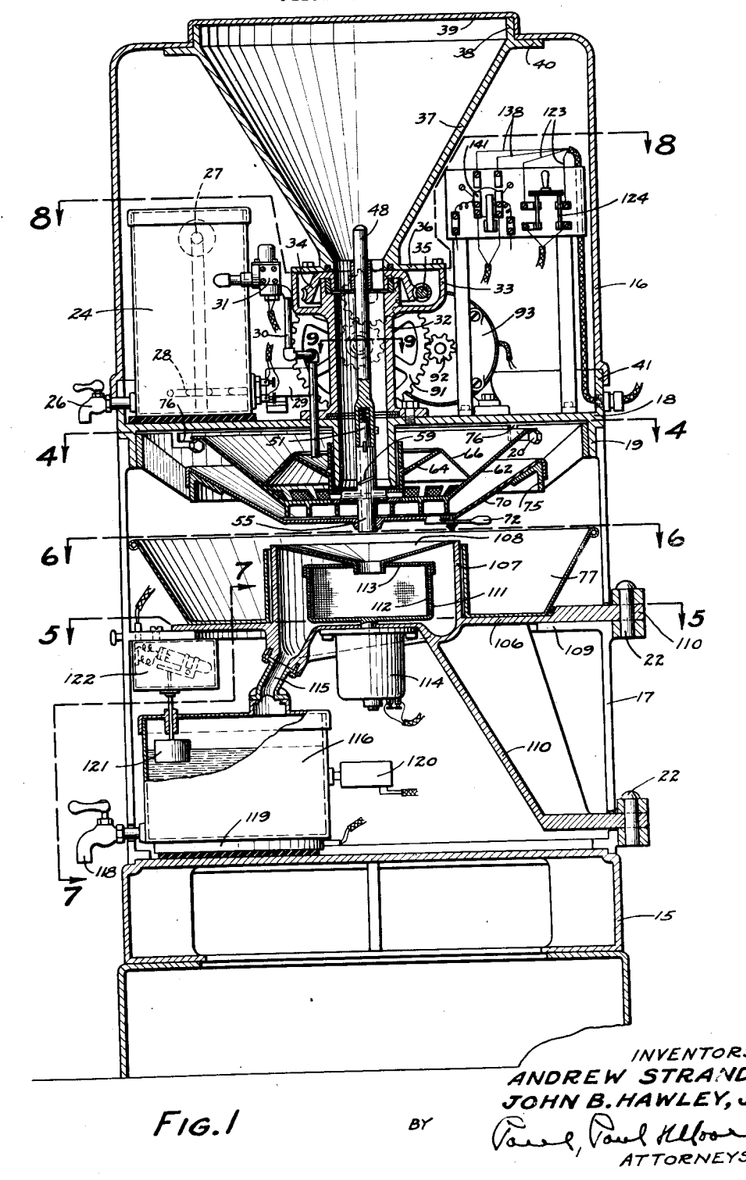
Fig. 1 is a vertical, substantially central sectional view of a machine in which the principles of the invention are incorporated.
Figure 2:
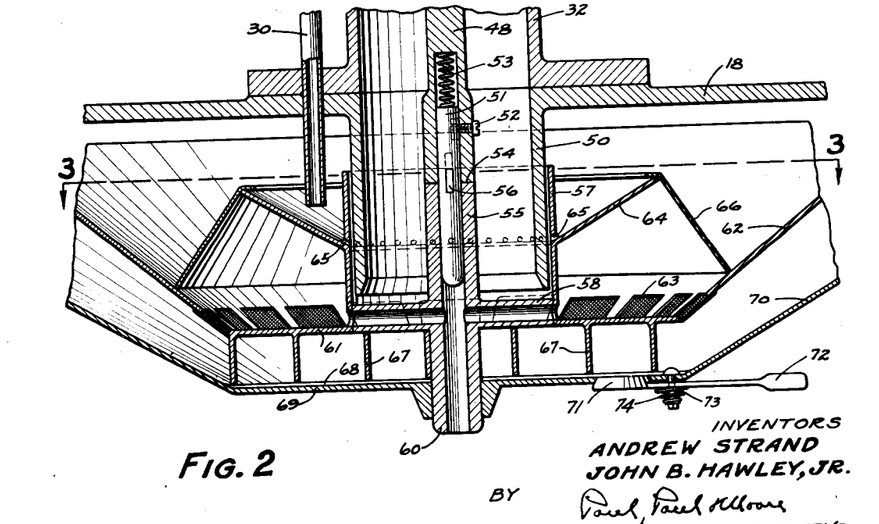
Fig. 2 is a detail sectional view taken diametrically through the coffee making mechanism proper, the view being substantially an enlargement of certain of the structure shown in Fig. 1.

The sleeve 57 is integral at its lower edge with a tray comprising a bottom 61 and inclined flanges 62, the upper edges of which flanges extend close up to the partition or floor 18, as shown in Fig. 1. An annular series of screened openings 63 extend about the inner circumference of the flanges 62, and the liquid coffee or beverage flows through these screened openings as said liquid coffee or beverage is drained off from the coffee granules. The screens 63 may be said to be self cleaning in that the rotation of the feed causes the wet coffee grounds to move past the said screens and prevents any of such grounds from accumulating thereon.

An integral funnel shaped flange 64 extends upwardly and outwardly from an intermediate part of the sleeve 57, and said sleeve 57 is provided with a row of perforations 65 immediately above its line of attachment or connection with the flange 64. The funnel shaped flange 64 is arranged to receive hot water from the pipe 30 leading from the hot water tank 24, and hot water received by said funnel shaped flange is immediately discharged through the perforations 65 and flows down between the sleeves 50 and 57 and contacts with the coffee granules. A frusto-conical sheet metal ring member 66 is arranged to rest upon the members 62 and 64, in the manner shown, and its purpose is to better enclose the liquid coffee passing between said members 62 and 64 and thus assist in preventing the escape of heat and aroma.

A scroll or helical feed screw 67 depends from and is formed integral with the bottom 61 of the tray, and the inner end of said scroll or helical feed screw is disposed immediately under the open sleeve 50 to receive the stream of coffee granules being fed down therethrough. The scroll or helical feed screw 67 operates immediately over a series of radial ribs 68 of a non-rotatable pan 69, having dished flanges 70 extending under and substantially parallel to the inclined side flanges 62 of the tray. The pan 69 is preferably provided with a draining port closed by a valve head 71 of a hand lever 72 pivotally secured as at 73 and normally held closed by a spring 74.

The pan 69—70 is carried by a skeleton frame 75 having bayonet slots 76 by which it can be quickly attached to and removed from the lugs or bolts 20 in the depending flange 19 of the partition or floor 18. It is to be understood that the pan 69—70 rotatably supports the entire mechanism 55, 57, 60, 61—62, 64, 66.

Figure 3:
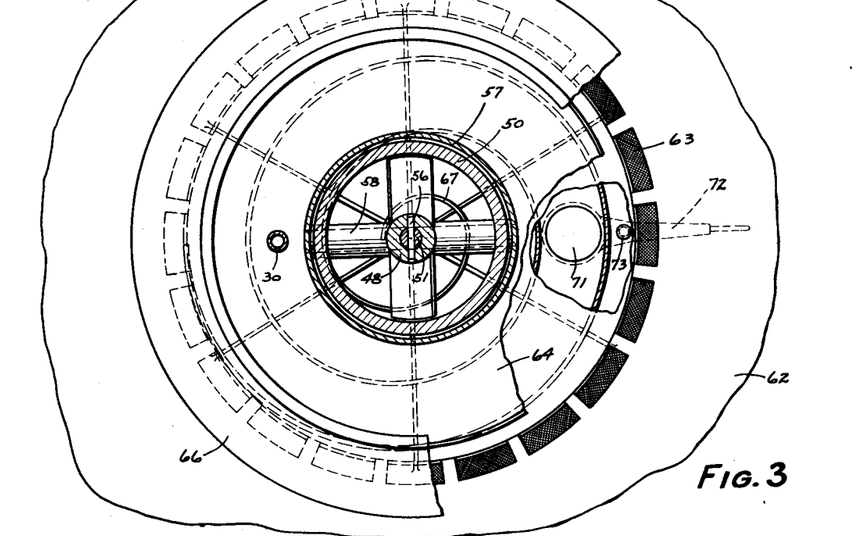
Fig. 3 is a detail sectional view taken as on line 3—3 in Fig. 2.
Figure 4:
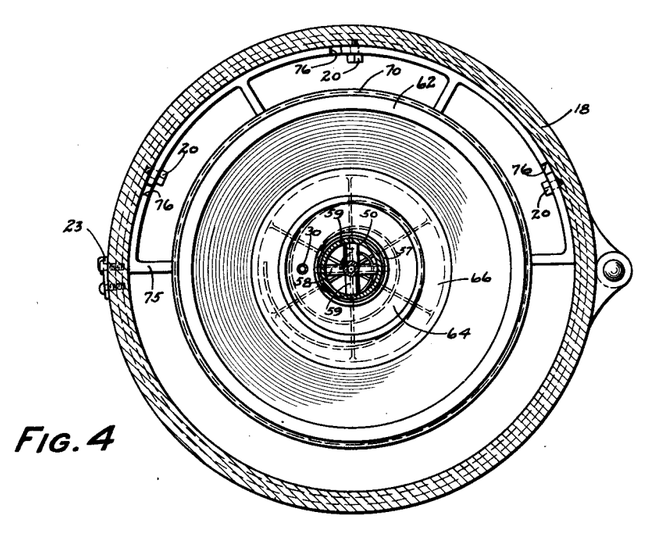
Fig. 4 is a sectional view taken as on line 4—4 in Fig. 1.
Figure 5:
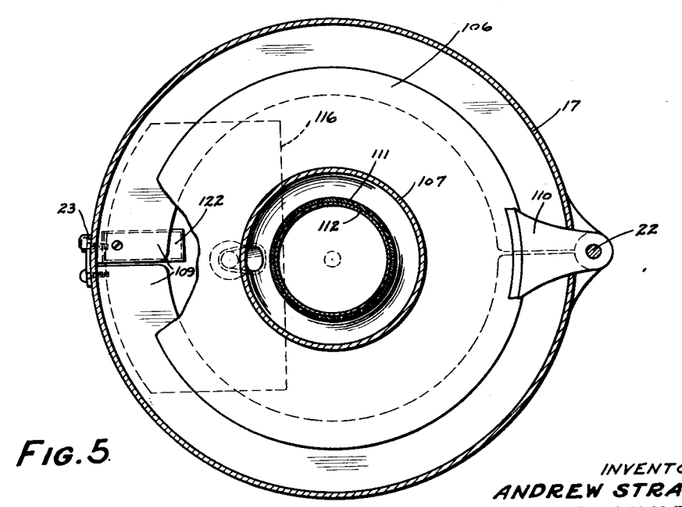
Fig. 5 is a sectional view taken as on line 5—5 in Fig. 1.

The operation of the machine as so far described is as follows. The hopper 37 being properly supplied with ground coffee, said coffee will, naturally, be delivered in a column extending down through the hollow post or standard 32, the sleeve 50, and the scroll or helical feed screw 67. As the ground coffee comes into contact with said scroll or feed screw 67, and with the latter rotating in anti clockwise direction, as seen in Figs. 3 and 4, the coffee grounds are moved radially by the scroll until they reach the end thereof, after which said grounds are moved upwardly over the inclined or d'shed flanges 70 of the pan 69, during which period said coffee grounds have had ample time to become thoroughly drained of all of the juices which they contained. The spent, dry coffee grounds then drop from the edge of the pan 69 into a circular receptacle 77 about and beneath said pan, from which receptacle the grounds can be conveniently removed when the machine is open as in Fig. 6.

The hot water coming through the pipe 30 is dropped upon the funnel shaped flange 64, and as said hot water filters through the perforations 65 it is delivered down to the end of the sleeve 50, at which point it flows into the column of ground coffee being fed downwardly into the scroll or helical feed screw 67. The feed propeller blades 59 operate to press the lower or now moistened end of the coffee down into the feed scroll. The volume of hot water admitted is regulated in connection with the speed of the feed scroll so that the proportion of water to coffee granules will give the exact amount of liquid coffee to be made for each pound of ground coffee employed. The mechanism for so regulating and adjusting the relative volumes of water and coffee will be fully described hereinafter. As the hot water is del'vered into the coffee granules, it immediately filters therethrough, and the downward motion of the water is stopped by the pan floor 69. The level of the liquid rises through the coffee body and in the chamber formed by the inclined flange members 62—70 until it reaches the plane of the screened openings 63. At this t'me the liquid, which has become the beverage by reason of the fact that it has absorbed the necessary ingredients from the coffee granules, flows in through the screened openings 63 and over the tray bottom 61, and thence is drained by the transverse pipe 58 to the hollow spindle 55 and out through the hollow projecting portion 60 of said spindle. It will be noted that the hot water is maintained in continuous contact with the coffee granules during the travel of the latter from the lower end of the sleeve 50 until said granules have passed well up on the dished flanges 70, and thus the hot water fully absorbs all of the ingredients from the granules adapted to produce the beverage.

As before suggested, the strength of the coffee extract, or, in other words, the number of liquid cups of beverage per pound of coffee granules, will depend entirely upon the speed of the feed scroll 67 with reference to the amount of hot water drawn from the tank 24. It may be desirable to provide several selective speeds for the rotation of the feed scroll shaft 48. In the machine disclosed, the mechanism for driving said feed scroll shaft, and for determining its speed, is more clearly illustrated in Figs. 1, 8, 11 and 12.

Figures 11, 13:
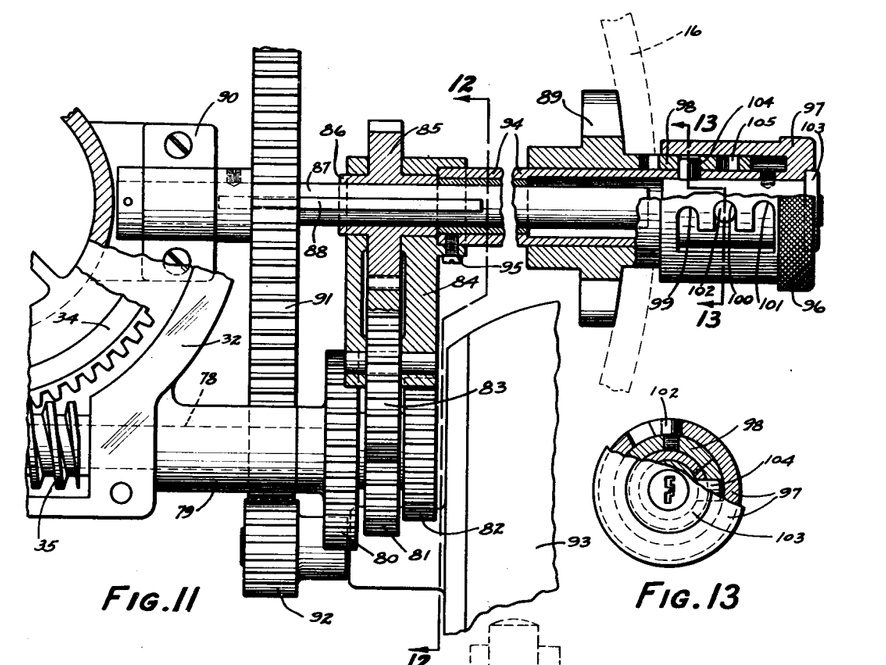
Fig. 11 is a detail view of the mechanism for determining the flow of ground coffee with respect to the incoming hot water, and consequently the strength of the beverage, as seen in Fig. 8, but enlarged and with some parts sectioned away.
Fig. 13 is a detail view in elevation and partly in section as on line 13—13 in Fig. 11.
Figure 12:
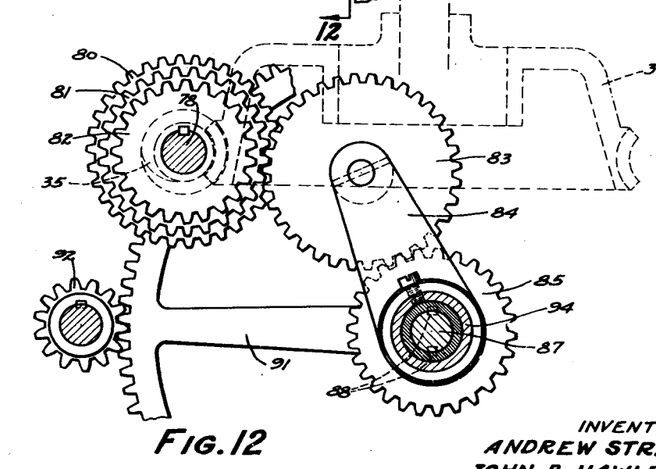
Fig. 12 is a sectional view as seen on irregular line 12—12 in Fig. 11.

The worm 35, that drives the worm gear 34, is mounted at one end of a shaft 78, that is journaled in a bearing 79, and is provided, at its opposite end, with (in the present instance) three spur pinions 80, 81 and 82. The pinions 80, 81 and 82 are selectively engageable by a gear 83 mounted in a lever 84, and continuously meshes with a gear 85. The lever 84 has a collar that rotatably receives the hub 86 of the gear 85, and the hub 86 is in turn slidably retained upon a shaft 87 by a key 88. Thus the lever 84 can be lifted and moved to bring the gear 83 into mesh with any one of the pinions 80, 81, 82, and the shaft 87 when turning will continuously rotate the gear 83. The shaft 87 is suitably journaled, as at 89 and 90, and is driven by a gear 91 meshing with a drive pinion 92 of an electric motor 93. The lever 84, and its gear 83, are manipulated to effect the desired speed connection by movement of a tubular sleeve 94 to one end of which the lever 84 is fastened, as at 85. The sleeve 94 houses and extends beyond the outer end of the shaft 87, and is rotatably and slidably carried by the bearing 89. Said sleeve 94 desirably extends outside of the machine housing so that its knurled outer end 96 is readily accessible to an operator. An integral, but annularly spaced collar portion 97 of the sleeve 94 rotatably and slidably operates on a hub extension 98 of the bearing 90. The collar portion 97 is provided with a set of three (or more) communicating notches 99, 100, and 101, adapted to selectively engage over a pin 102 secured in the extension 98. With the pin in the notch 100, as shown in Fig. 11, the gear 83 will be in mesh with the pinion 81, in which event the machine would have a capacity of, say, for instance, forty cups of liquid coffee per pound of coffee granules, and in a similar manner the employment of notches 99 and 101 will conveniently give a capacity of say, for example, possibly thirty-two or forty-eight cups per pound, respectively. Thus the strength of the beverage may be regulated and positively determined. The mechanism just described is preferably also provided with a lock in the form of a cylinder 103 secured in the end of the sleeve 94, and having a bolt 104 for selectively locking engagement with notches 105 in the hub 98. Thus the pin 102 may be locked into any one of the notches 99, 100, 101, desired. The object of this lock is to enable a restaurant proprietor to keep an accurate check on the number of cups of coffee sold by an employee and thus prevent pilfering of ground coffee. A counting device (not shown) can be applied to the machine.

Figures 6, 7:
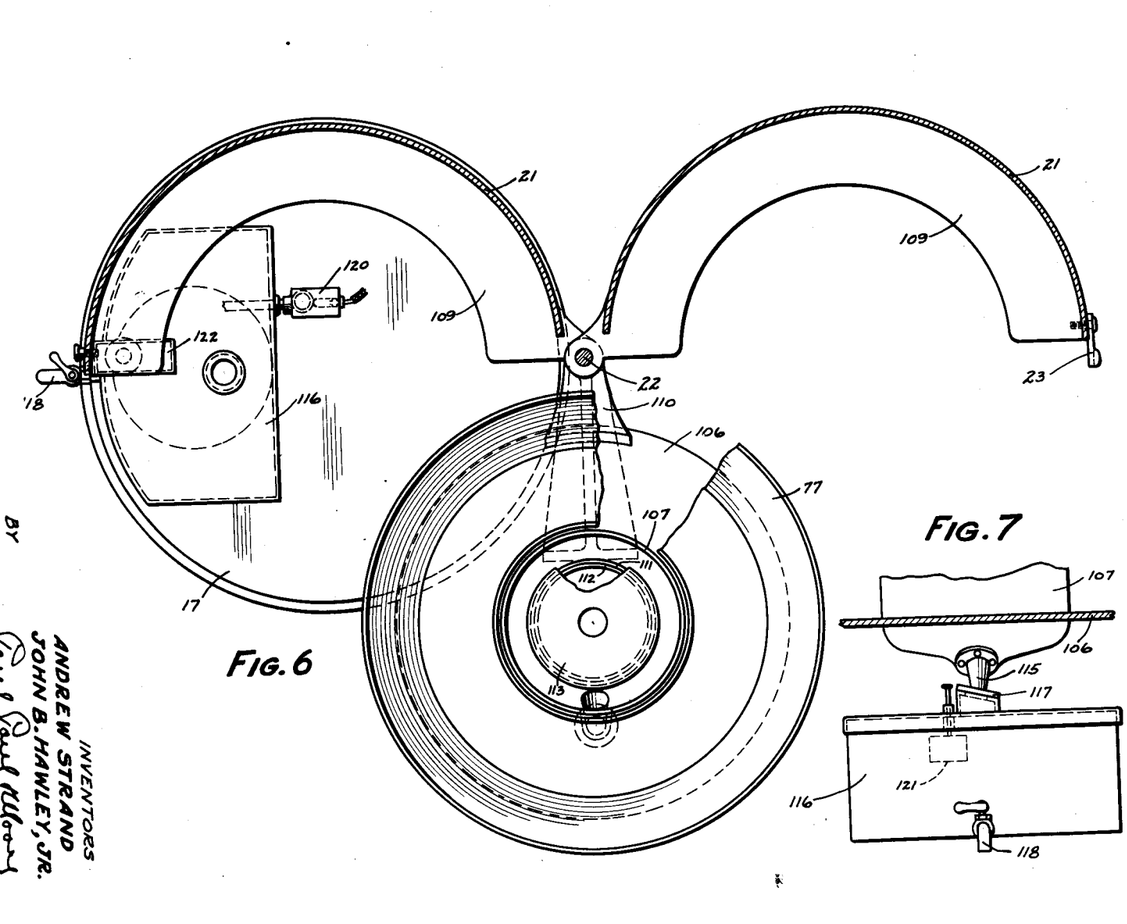
Fig. 6 is a sectional view taken as on line 6—6 in Fig. 1, but showing the lower part of the machine as when open to be cleaned or repaired.
Fig. 7 is a detail elevational view of the service receptacle as seen substantially on line 7—7 in Fig. 1.

The circular receptacle 77 is supported upon a shelf 106 terminating in a central, cup-shape chamber 107 that projects above the receptacle 77 to support a funnel 108 situated beneath the projecting portion 60 of the spindle 55. The shelf 106 may desirably be supported on a pair of segmental ledges 109 projecting integrally inward from the lower housing section 17. Said shelf 106 may be further supportet by integrally formed arms 110 that are pivotally supported upon the pivot pins 22 for the semi-cylindrical sections 21, so that when said semi-cylindrical sections 21 are swung to open position, the shelf 106 can also be swung out as shown in Fig. 6, for cleaning and repairing purposes. When the parts 106—107, 108 and 77 are thus swung out, the skeleton frame 75 can be removed, and the spindle 55 and its associated parts can be removed downwardly. By then also removing the upper section 16 of the housing and the cover 39, every part of the machine is conveniently accessible for any desired purpose.

A centrifuge 111, rotatably secured within the chamber 107, consists of a metal cup having perforated side walls which are lined with a screen or fabric 112. A cover 113 for the centrifuge has a central aperture which receives the nozzle of the funnel 108. The centrifuge is supported on the vertical shaft of a motor 114 fastened upon the under side of the cup-shaped chamber 107. As the liquid coffee is delivered into the centrifuge, which is desirably driven at a high speed, it is forced out through the screen 112 to be thus strained and clarified.

The liquid coffee passes down through a neck 115 to a service receptacle 116. As shown more clearly in Figs. 1 and 7, the neck 115 has an inclined seating flange 117 for contact with a similar inclined end of a filler neck of the service receptacle, making it unnecessary to separately disconnect the neck 115 when swinging the shelf or support 106 out of the lower housing. When said shelf or support 106 is turned back into place, the neck 115 is automatically restored to its operative position.

Liquid coffee is drawn from the service receptacle 116 as required, through a service cock 118. The liquid coffee in the service receptacle 116 is maintained at a uniform temperature by a heating element 119 the circuit to which is controlled by a thermostat 120, and the volume of coffee in the service receptacle is automatically replenished as used, through the action of a float 121 operatively associated with a mercoid tube or switch 122 controlling the main power circuits.

Figure 14:
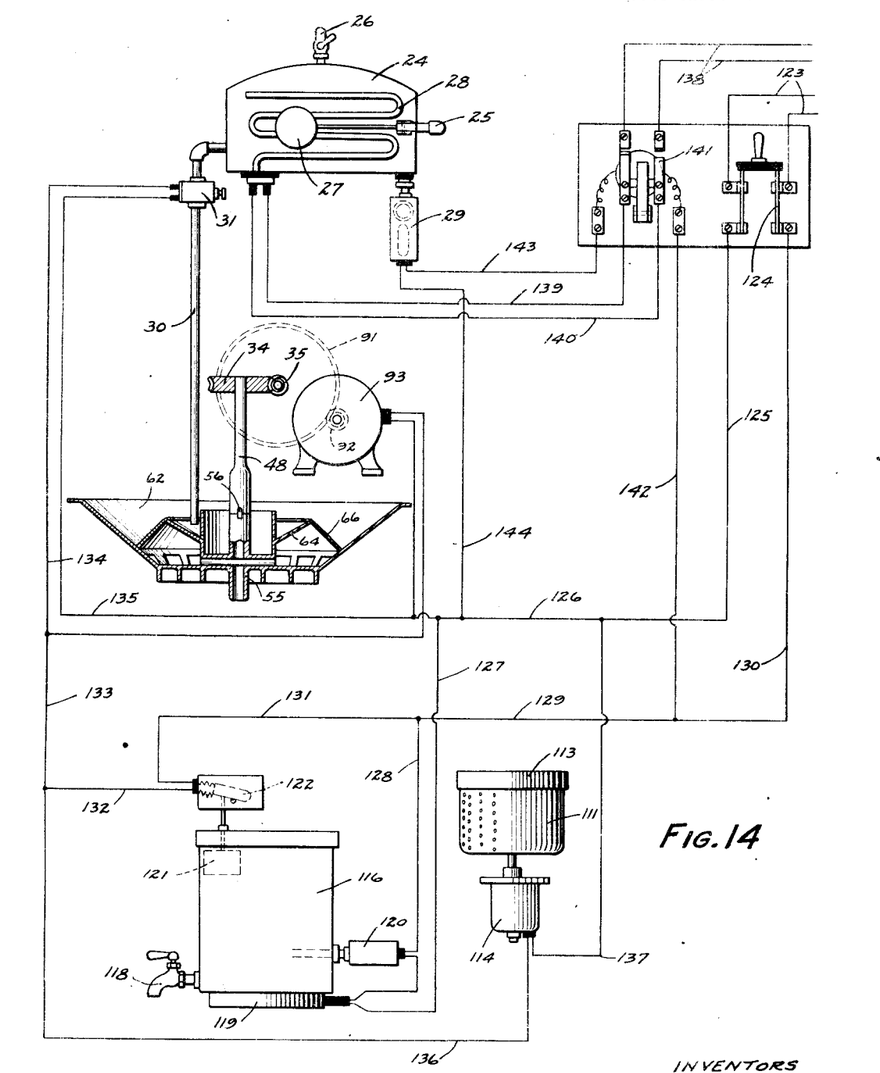
Fig. 14 is a diagrammatic view illustrating the electric circuit system of the machine and controls and actuated parts cooperating with said electric circuit system.

With more particular reference to Fig. 14, wires 123 are lead in wires, which may desirably be of one hundred and ten volts, for supplying several of the elements of the machine, under the control of a hand switch 124. Wires 125, 126, 127, 128, 129 and 130 leading from the hand switch 124 comprise a complete circuit to the heater 119 and the thermal switch 120, to permit the heater 119 to automatically retain the coffee in the receptacle 116 at a predetermined temperature regardless of the operation or condition of other devices of the machine. Wires 131, 132, 133, 134 and 135 connect with wires 129 and 126 to complete a circuit through the float operating mercoid switch 122 and the hot water supply tank control valve 31, to open and close said valve 31 when the switch 122 is closed or opened. Closing of the switch 122 by lowering of the float 121 also energizes a circuit comprising wires 136 and 137 to the motor 114, thus setting the centrifuge 111 in motion. The prepared coffee in the receptacle 116 may desirably be maintained at a temperature of approximately 120° F., a one hundred and ten volt current and a six hundred watt heater being sufficient for this purpose. The water in the receptacle 24 will be of greater volume and should ordinarily be maintained at a higher temperature, desirably about 210° F. The heater 28 may desirably be of about three thousand watt capacity and to supply this heater with an ample volume of electricity a two hundred and twenty volt supply line 138 may be employed. The supply line 138 is circuitously connected to the heater 28 by circuit wires 139 and 140, after passing through a relay switch 141. The relay switch is held closed by a one hundred and ten volt current in a circuit including a wire 142 connected to the wire 130, and wires 143 and 144 which include the thermal switch 29 and connect with wire 126. It will thus be seen that when the switch 124 is open, as when the machine is shut down, it will be impossible for the heater 28 to remain energized for the reason that there is no supply to the switch 29, but that as soon as the switch 124 is closed it will permit the one hundred and ten volt current to close the switch 141 to thereby permit the switch 29 to function in its control of the heavier current to the heater 28.

When the machine is to be cleaned or repaired, the gates 46 are first closed. The valve 71 is then opened, and by injecting a sufficient flow of hot water through the pipe 30, the entire coffee mixing or making mechanism can be flushed out. To more thoroughly clean the mechanism, it is only necessary to open the lower housing and give the skeleton frame 75 a partial turn to release its bayonet slot 76 from the lugs or bolts 20. This action permits quick removal of the skeleton frame, as well as removal of the entire coffee mixing or making mechanism which the skeleton frame supports. With the coffee mixing or making unit removed, it can obviously be cleaned or repaired and replaced in the machine with a minimum amount of effort.

We claim as our invention:

1. In a beverage making machine, a stationary support, means for delivering beverage making material to said support, means for conveying said beverage making material away from the point of delivery toward the edges of the support, and means for supplying a liquid to the beverage making material as it is being so conveyed.

2. In a beverage making machine, a stationary support, means for delivering beverage making material to said support, means for conveying said beverage making material away from the point of delivery toward the edges of the support, and means for supplying a liquid to the beverage making material as it is being so conveyed, said conveying means comprising a rotatable device adapted to engage the beverage making material as it is delivered to the support.

3. In a beverage making machine, a stationary support, means for delivering beverage making material to said support, means for conveying said beverage making material away from the point of delivery toward the edges of the support, and means for supplying a liquid to the beverage making material as it is being so conveyed, said conveying means comprising a rotatable feed scroll operative in the beverage making material arranged on said support.

4. In a beverage making machine, a stationary support, means for delivering beverage making material to said support, a tray disposed over the support, means for rotating the tray, and means carried by the tray to operate in the beverage making material delivered to the support to convey said beverage making material outwardly upon said support.

5. In a beverage making machine, a stationary support, means for delivering beverage making material to said support, a tray disposed over the support, means for rotating the tray, and a feed scroll carried upon the tray to actuate the beverage making material outwardly on said support.

6. In a beverage making machine a support having a series of ribs upon the upper surface thereof, and a rotatable feed scroll operative immediately above said ribs.

7. In a beverage making machine, a hopper for beverage making material, a support disposed below the hopper, a feed tube for conveying beverage making material from the hopper to the support, a shaft rotatable in the tube, and mechanism disposed over the support and driven by the shaft for moving said beverage making material outwardly on said support.

8. In a machine for making coffee and the like, a pan, means for delivering coffee granules centrally to the pan, means for moving the granules over and thence from the pan, means for delivering hot water to the moving mass of granules, and means at a level above the bottom of the pan for draining off the liquid coffee.

9. In a machine for making coffee and the like, a pan, means for delivering coffee granules centrally to the pan, means for moving the granules over and thence from the pan, means for delivering hot water to the moving mass of granules, and means for drawing off the liquid coffee in the pan as it reaches a predetermined level above the bottom thereof.

10. In a machine for making coffee and the like, a pan, means for delivering coffee granules centrally to the pan, means for moving the granules over and thence from the pan, means for delivering hot water to the moving mass of granules, and means including screened outlets disposed at a level above the pan bottom for draining off the liquid coffee.

11. In a machine for making coffee and the like, a pan, a feed scroll operating in the pan to move granules fed centrally thereto outwardly and from the pan, a tray disposed over the pan, and having screened openings to exclude the granules but which will permit liquid coffee to flow from the pan into the tray, and means for draining the tray.

12. In a machine for making coffee and the like, a pan, a feed scroll operating in the pan to move granules fed centrally thereto outwardly and from the pan, a tray disposed over the pan, and having screened openings to exclude the granules but which will permit liquid coffee to flow from the pan into the tray, and means for draining the tray, said tray being rotatable whereby the opening screens will have self-cleaning contact with the mass of coffee granules in the pan.

13. In a machine for making coffee and the like, a pan adapted to receive a supply of coffee granules at substantially a central point, a tray rotatably mounted in spaced relation above the pan, means carried by the tray for actuating the coffee supply in the pan outwardly from its point of receiving the same, means for applying hot water to the coffee supply as it is delivered to the pan, and means disposed outwardly with respect to the pan center for draining the pan.

14. In a machine for making coffee and the like, a pan adapted to receive a supply of coffee granules at substantially a central point, a tray rotatably mounted in spaced relation above the pan, means carried by the tray for actuating the coffee supply in the pan outwardly from its point of receiving the same, means for applying hot water to the coffee supply in the pan, said tray being provided with an annular series of openings whereby liquid coffee may be drained from the pan into the tray, and means for draining the tray.

15. In a machine of the character described, a receptacle for holding coffee granules and the like, a tray disposed in but spaced above the receptacle, means for supplying hot water to the receptacle for making the liquid coffee therein, said tray being provided with openings, at a level above the bottom but below the top of the pan, to drain off the liquid coffee as it reaches a predetermined level.

16. In a machine of the character described, a receptacle for holding coffee granules and the like, a tray disposed in but spaced above the receptacle, means for supplying hot water to the receptacle for making the liquid coffee therein, said tray being provided with openings, at a level above the bottom but below the top of the pan, to drain off the liquid coffee as it reaches a predetermined level, and means for draining the tray.

17. In a machine of the character described, a receptacle for holding coffee granules and the like, a tray disposed in but spaced above the receptacle, means for supplying hot water to the receptacle for making the liquid coffee therein, said tray being provided with openings at a level above the bottom but below the top of the pan to drain off the liquid coffee as it reaches a predetermined level, and screens covering the openings whereby to filter the liquid coffee.

18. In a machine of the character described, a receptacle for holding coffee granules and the like, a tray disposed in but spaced above the receptacle, means for supplying hot water to the receptacle for making the liquid coffee therein, said tray being provided with openings at a level above the bottom but below the top of the pan to drain off the liquid coffee as it reaches a predetermined level, screens covering the openings whereby to filter the liquid coffee, and means for rotating the tray whereby the said screens will have self-cleaning contact with the granules in the receptacle.

19. In a machine of the character described, a receptacle for holding coffee granules and the like, a tubular member disposed centrally above the receptacle to deliver such granules thereto, a tray having a feed mechanism disposed in the receptacle and about said tubular member, said tray being arranged to receive liquid coffee from the receptacle when it reaches a predetermined level therein, and a hollow spindle carried by and communicating with the tray to drain the latter.

20. In a machine of the character described, a receptacle for holding coffee granules and the like, a tubular member disposed centrally above the receptacle to deliver such granules thereto, a tray rotatably disposed about said member and in spaced relation over the receptacle, said tray having an annular series of perforations for delivering hot water to the coffee granules as they are being discharged from the tubular member to the receptacle.

21. In a machine of the character described, a pan having sloping sides, a tray having sloping sides and disposed above the pan, said tray having a hollow hub portion through which granules may be fed to the pan, means for delivering water to the granules in the pan, the sloping sides of said tray being provided with screened ports through which liquid may be conducted from the pan to the tray, and means for draining the tray.

22. In a machine of the character described, a pan having sloping sides, a tray having sloping sides and disposed above the pan, said tray having a hollow hub portion through which granules may be fed to the pan, means for delivering water to the granules in the pan, the sloping sides of said tray being provided with screened ports through which liquid may be conducted from the pan to the tray, a spindle carried by the tray within the hub, and tubular connection between the tray and spindle.

23. In a machine of the character described, a pan in which coffee granules and the like are intermixed with water to form liquid coffee, a tray member disposed in the pan and having openings to receive the liquid coffee therefrom, a supply member extending through a hub portion of the tray member to supply granules to the pan, and means carried by such hub portions to receive water and apply it to the granules at substantially their point of delivery from the supply member.

24. In a device of the character described, a coffee making receptacle for receiving granules and water to make the liquid coffee, a tray rotatable in the receptacle and having a feed scroll depending therefrom, said tray also having a hub member, a flange extending therefrom to receive water as the tray rotates, and a ring member closing the outer edge of the flange with a portion of the tray to complete a circular chamber formed by the tray, hub member, flange and ring member.

25. In a machine of the character described, the combination including a relatively stationary perforated tray, means for distributing coffee granules and the like over the tray, valve controlled means for feeding hot water to the granules in the tray, a service receptacle arranged to receive the liquid coffee draining from the tray, and means controlled by variations in the volume of liquid coffee in the receptacle to automatically start and stop the distributing and feeding means.

26. A beverage making machine comprising a hot water storage tank, a granule hopper, a mechanism for infiltering water from the tank with granules from the hopper, to form the beverage, means for straining the beverage, a service receptacle to receive the strained beverage, and float controlled devices for maintaining the contents of the tank and receptacle at predetermined levels.

27. A coffee making machine comprising a housing, a coffee making mechanism in the upper part of the housing, a filtering unit in the lower part of the housing, said unit comprising a removable frame, a chamber carried by the frame, a centrifuge mounted within the chamber, and means for conducting coffee from the making mechanism to the centrifuge.

28. A beverage making machine comprising an upright housing having a horizontal partition dividing it into upper and lower chambers, a beverage making mechanism supported by the partition and disposed principally within the upper chamber, a beverage straining mechanism disposed in the lower chamber, a door for the lower chamber, and a frame, movable outwardly when the door is open, to support the straining mechanism.

In witness whereof, we have hereunto set our hands this 21st day of February, 1930.

ANDREW STRAND.
JOHN B. HAWLEY, Jr.